United States Patent [19]

Cogliati et al.

[11] Patent Number: 5,207,814
[45] Date of Patent: May 4, 1993

[54] PROCESS FOR PREPARING MONOLITHS OF AEROGELS OF METAL OXIDES

[75] Inventors: Guido Cogliati, Rome; Giovanni Bezzi, Bagnacavallo, both of Italy

[73] Assignee: Enichem S.p.A., Milan, Italy

[21] Appl. No.: 772,934

[22] Filed: Oct. 8, 1991

Related U.S. Application Data

[63] Continuation of Ser. No. 476,962, Feb. 7, 1990, abandoned.

[30] Foreign Application Priority Data

Feb. 10, 1989 [IT] Italy .................... 19404 A/89

[51] Int. Cl.$^5$ .................... C03B 19/06; C03B 37/016
[52] U.S. Cl. .................... 65/18.3; 65/3.11; 65/18.1; 65/32.5; 65/900; 65/901; 501/12
[58] Field of Search .................... 65/3.11, 32.5, 18.3, 65/17, 18.1, 900, 901; 501/12

[56] References Cited

U.S. PATENT DOCUMENTS

| | | | |
|---|---|---|---|
| 4,574,063 | 3/1986 | Scherer | 65/901 |
| 4,680,049 | 7/1987 | Onorato et al. | 65/18.1 |
| 4,801,318 | 1/1989 | Toki et al. | 65/18.1 |
| 4,806,328 | 2/1989 | Lierop et al. | 501/12 X |

FOREIGN PATENT DOCUMENTS

| | | |
|---|---|---|
| 0048099 | 3/1982 | European Pat. Off. . |
| 0131057 | 1/1986 | European Pat. Off. . |
| 0184255 | 6/1986 | European Pat. Off. . |
| 0234816 | 9/1987 | European Pat. Off. . |

OTHER PUBLICATIONS

Patent Abstracts of Japan, vol. 9, No. 247 (C-207, 1970) & JP-A-60103024 (Jun. 7, 1985).
CA 136489x, vol. 108, No. 16 (Apr. 1988) & JP-A-6302819.
J. Non-crystalline Solids, vol. 48 (1982), pp. 129–152.

*Primary Examiner*—Robert L. Lindsay
*Attorney, Agent, or Firm*—Hedman, Gibson & Costigan

[57] ABSTRACT

A process for the preparation of monoliths of aerogels of metal oxides, which aerogel is either constituted by one single oxide, or is constituted by a mixture of oxides, is disclosed, which process consists of the following operating steps:

(a) the relevant metal alkoxide(s) is/are mixed with water in the presence of a catalyst of acidic character;
(b) the so obtained mixture is hydrolysed;
(c) a colloidal suspension of the oxide of a metal equal to, or different from, the metal(s) used in the (a) step is added to the hydrolysate;
(d) the so obtained colloidal solution is caused to turn into a gel (gelation) having the desired shape and dimensions;
(e) the gel is washed;
(f) the gel is dried at values of temperature and pressure which are higher than the critical pressure and temperature values of the solvent used for the washing.

12 Claims, No Drawings

PROCESS FOR PREPARING MONOLITHS OF AEROGELS OF METAL OXIDES

This is a continuation of application Ser. No. 07/476,962, filed Feb. 7, 1990 abandoned.

The present invention relates to a process for the preparation of monoliths of aerogels of metal oxides, which process comprises an acidic hydrolysis of an alkoxide of the particular metal (s), the gelation of the resulting colloidal solution and the drying of the resulting gel at temperature and pressure values higher than the critical temperature and pressure values of the solvent used in a prior washing step.

The method for preparing monoliths of glasses, glass-ceramic monoliths, ceramic monoliths based on silicon-oxide, alumina, zirconium oxide, titanium oxide, and the like, based on the mixing of the alkoxide of the concerned metal with alcohol, water and a suitable catalyst, as an acid or a base, is well known (e.g., from U.S. Pat. No. 4,681,615). According to this method, the hydrolysis and polycondensation of the alkoxide takes place, with a colloidal solution and then a gal (alcogel) being formed.

Furthermore, from U.S. Pat. No. 4,432,956, it is known that, if said alcogel is dried under hypercritical conditions, the resulting product is an aerogel: i.e., a low-density material, which finds a large number of applications both as a finished product (e.g., as a transparent insulating material, a catalyst or a catalyst support, and so forth), and as an intermediate product for manufacturing high-density glasses, glass-ceramic materials, or ceramic materials.

The main drawback of the above said preparation method is that if one operates with concentrated solutions of the metals oxides, monoliths free from faults (microcracks) is not generally obtained. The preparation has hence to be carried out with diluted solutions; but, in such case, when the porous material is submitted to the step of density increase, the large volume shrinkage causes deformations, and makes it difficult the dimensional specifications of the desired product, unless further mechanical processing are carried out.

Furthermore, the hypercritical drying should be carried out under very well-controlled operating conditions owing to the presence of toxic and/or flammable materials (ethyl alcohol, methyl alcohol).

Furthermore, in the above mentioned preparation process, the solvent to be removed from the alcogel is constituted by a water-alcoholic solution with a high content of water: therefore high temperatures and pressures have to be used in order to operate under conditions exceeding the critical values by a wide margin. If the alcogel has very small porosities, the removal of the solvent from the pressurized container should be carried out very slowly in order to obtain acceptable yields of large-size monoliths free from faults.

It is known that monoliths of silica gel having large-size porosities which are more easily dried, can be manufactured by adding colloidal silica to the solution of the hydrolysed alkoxide. In fact, glass monoliths of considerable dimensions were obtained by means of the sintering of the xerogel obtained by slow drying under room pressure of alcogels containing colloidal silica, and products of hydrolysis and polycondensation of silicon alkoxides (e.g., U.S. Pat. No. 4,681,615).

According to this patent, the preparation of the colloidal silica comprises a step of increasing pH value by means of the addition of ammonium hydroxide, which step is very critical, in that the concerned solution is very viscous, and at high pH values the gelation times are very short (of some minutes) and the useful pH range is very narrow.

Furthermore, the drying of the alcogel under ambient conditions of temperature and pressure is very delicate and takes place within a very long time (of at least one week): the yield of monoliths of xerogel free from faults is not constant and reproducible, and is often lower than 100%; the process is carried out in the presence of toxic and/or flammable solvents; and, finally, the disclosed method does not product an aerogel, but a xerogel.

The present Applicant has discovered a process for the preparation of monoliths of an aerogel of one or more metal oxide(s), which makes it possible to overcome all of the drawbacks, which have been just described by referring to the methods known from the prior art and which, among others, are nearly exclusively relating to the preparation of silica-based structures.

In particular, the process according to the present invention displays the following features, which make it very advantageous:

the colloidal solution contains very high concentrations of the metal oxide(s) in question:
drying temperature and pressure are relatively low;
the same drying is completed within time intervals of the order of the hours;
the use of either flammable or toxic solvents is absolutely avoided;
the end result is characterized by quantitative yields of fault-free monoliths, which may also be of large size.
the gelation times are of the order of a few hours;
an increase of the pH value of the colloidal solution is not necessary.

Such a process is carried out by means of the following operating steps:
(a) an alkoxide of at least one metal is mixed with water in the presence of a catalyst of acidic character;
(b) the so obtained mixture is hydrolysed;
(c) an oxide of at least one metal is added to the hydrolysate as a fine powder with a high specific surface area;
(d) the so obtained colloidal solution is caused to turn into the gel state (gelation);
(e) the gel is washed;
(f) the gel is dried at a temperature and pressure which are higher than the critical pressure and temperature values of the solvent used for the washing.

Therefore, the (a) step corresponds to the preliminary mixing of one or more alkoxide(s) with water and an acidic substance as the catalyst: the selection of an alkoxide of a metal, or a plurality of alkoxides of metals is of course dictated by the desired nature of the end monolith, which can be constituted by one oxide only, or by a mixture of two or more oxides. Each metal oxide—with particularly attractive results being obtained in the case of oxides selected from among silica, alumina, zirconium oxide and titanium oxide—can be used as such, or the metal oxides can be used in mixture with each other. Any alkoxides can be used as the starting material, with the use of alkoxides derived from aliphatic alcohols with a small number of carbon atoms being preferred; with methyl alcohol and ethyl alcohol being most preferred.

In order that the hydrolysis of the step (b) may take place, the presence of an acidic catalyst is necessary, and any catalysts known for the intended purpose can be used; still according to a preferred form of a practical embodiment, the use of hydrochloric acid, nitric acid or acetic acid is preferred.

The hydrolysis is carried out at room temperature and, at the end, the solution of the hydrolysate is mixed with a metal oxide—which is in the form of a volatile powder—selected from among the hereinabove listed metal oxides; the metal can be the same as, or different from, the metal(s) contained in the alkoxide used as the starting material: of course, colloidal silica will be used in case the hydrolysis was carried out by starting from a silicon alkoxide and the end product is a silica monolith; the same applies to the case of other oxides.

The colloidal solution is used in the subsequent step of gelation, in the same concentration as obtained in the preceding mixing of the hydrolysate with the colloidal suspension of the oxide; thus, the concentration can also be high, and no drawbacks are observed during the execution of the successive steps of the process according to the present invention.

The gelation of the colloidal solution is carried out by pouring the same solution into a container of the desired shape and dimensions; the operation is carried out at temperatures lower than 50° C. and within a time ranging from a few minutes to some hours.

The so obtained gel is suitably washed with a chlorinated organic solvent is order to remove the water-alcoholic solution contained inside the pores of the gel, and the use of a non-flammable solvent with low values of critical temperature and critical pressure is preferred.

The gel is finally dried under conditions of temperature and pressure higher than the above mentioned critical values of the washing solvent.

The yields to the end product are practically quantitative and the obtained products can be subsequently sintered until the desired glass-like monoliths are obtained.

The end products display all of the required characteristics for any possible successive applications known for them from the prior art, such as, e.g., a high surface area, a good transparency, a low coefficient of thermal expansion, and an extremely good degree of heat and sound insulation.

All of the above, and further operating details will be evident from the reading of the following illustrative examples, which shall not to be construed as being anyway limitative of the same invention.

EXAMPLE 1

100 ml of tetramethoxy silane (TMOS) is stirred at room temperature, for 2 hours, with 182 ml of an 0.01N solution of HCl. To the so obtained clear solution 40.5 g of colloidal silica AEROSIL 200 is added, still with stirring. The resulting mixture is further homogenized by means of a treatment of sonication for 10 minutes and then any silica agglomerates possibly contained in the solution are removed by centrifugation at 3,000 rpm.

The resulting colloidal solution has pH value of 2.2, and is poured into a polythene cylinder of 50 mm of diameter and 200 mm of height, and equipped with a tight-sealing cover. The gelation of the colloidal solution takes place at room temperature within approximately 12 hours: the gel undergoes a small reduction in diameter, sufficient to enable the gel to be easily extracted from the polythene tube. The silica gel cylinder is then placed inside a container also containing 500 ml of anhydrous, 1,1,1-trichloroethylene and is left standing at room temperature for 12 hours. The gel drying is carried out under hypercritical conditions, by charging the vessel which contains the silica gel to an autoclave of 3 liters of volume, which is then pressurized with nitrogen at room temperature up to the pressure of 80 bar. The heating of the autoclave is then started, at a heating speed of 150° C./hour, until the temperature of 300° C. is reached. With increasing temperature values, the pressure inside the autoclave increases up to 160 bar, and such a pressure value is kept constant by acting on the vent valves. With the temperature being still kept constant at 300° C., by acting on the vent valve, the pressure inside the autoclave is then caused to decrease down to room pressure, at the speed of 15 bar/hour. The solvent contained inside the autoclave is thus removed. The last traces of such a solvent are removed by washing the autoclave with a slow stream of nitrogen for about 15 minutes.

The autoclave is then rapidly cooled down to room temperature. The resulting silica aerogel is constituted by a translucent cylinder free from cracks or defects, of 45.5 mm of diameter, and of 190 mm of height, a density of 0.28 g/cm$_3$, a specific surface, as determined by means of a BET method, of 6.30 m$^2$/g, a volume of the pores of 1.65 cm$^3$/g, and an average diameter of the pores of 88.5 Å.

EXAMPLE 2

100 ml of tetraethyloxy silane (TEOS) is stirred at room temperature, for 2 hours, with 140 ml of an 0.01N solution of HCl. To the so obtained clear solution 40.5 g of colloidal silica AEROSIL 50 is added, still with stirring. The resulting mixture is further homogenized by means of a treatment of sonication for 15 minutes and then any silica agglomerates possibly contained in the solution are removed by centrifugation at 3,000 rpm.

The resulting colloidal solution has a pH value of 1.92, and is poured into a polythene cylinder of 50 mm of diameter and 200 mm of height, and equipped with a tight-sealing cover. The gelation of the colloidal solution takes place at room temperature within approximately 12 hours: the gel undergoes a small reduction in diameter, sufficient to enable said gel to be easily extracted from the polythene tube. The silica gel cylinder is then soaked in 500 ml of 1,1,1-trichloroethylene and is left standing at room temperature for 12 hours.

The gel drying is carried out under hypercritical conditions in the same way as disclosed in Example 1.

The resulting silica aerogel is constituted by an opalescent cylinder free from cracks or defects having a specific surface of 777 m$^2$/g, a volume of the pores of 1.9 cm$^3$/g, and an average diameter of the pores of 98.4 Å.

EXAMPLE 3

100 ml of tetraethyloxy silane (TEOS) is stirred at room temperature, for 2 hours, with 140 ml of an 0.01N solution of HCl. To the so obtained clear solution 40.5 g of colloidal silica AEROSIL 50 is added, still with stirring. The resulting mixture is further homogenized by means of a treatment of sonication for 15 minutes and then any possibly present silica agglomerates are removed by centrifugation at 3,000 rpm.

To the resulting colloidal solution a solution of 0.1N ammonium hydroxide is added until a pH value of 6, is reached, and then the resulting mixture is poured into a polythene cylinder of 50 mm of diameter and 200 mm of height, and equipped with a tight-sealing cover. The gelation of the colloidal solution takes place at room temperature within approximately 15 minutes, and the gel is left standing 12 hours at room temperature. A moderate volume shrinking takes place, which is anyway sufficient to enable said gel to be easily extracted from the polythene tube. The silica gel cylinder is then soaked in 500 ml of 1,1,1-trichloroethylene and is left standing at room temperature for 12 hours.

The gel drying is carried out under hypercritical conditions in the same way as disclosed in Example 1.

The resulting silica aerogel is constituted by a cylinder of an opaque material, free from cracks or defects, having a diameter of 43 mm, a height of 120 mm, a density of 0.26 g/cm$^3$, a specific surface of 330 m$^2$/g, a volume of the pores of 1.26 cm$^3$/g, and an average diameter of the pores of 150 Å.

EXAMPLE 4

100 ml of tetraethyl orthosilane (TEOS) is stirred at room temperature, for 2 hours, with 140 ml of an 0.01N solution of HCl. To the so obtained clear solution 81 g of colloidal silica AEROSIL 50 is added, still with stirring.

The resulting mixture is further homogenized by means of a treatment of sonication for 15 minutes and then any silica agglomerates possibly contained in the solution are removed by centrifugation at 3,000 rpm.

To the resulting colloidal solution a solution of 0.1N ammonium hydroxide is added until a pH value of 4.5 is reached, and the resulting mixture is then charged to a polythene cylinder of 50 mm of diameter and 200 mm of height, and equipped with a tight-sealing cover. The gelation of the colloidal solution takes place within approximately 15 minutes, and the gel is left standing 12 hours at room temperature. A moderate volume shrinking takes place, which is anyway sufficient to enable said gel to be easily extracted from the polythene tube. The silica gel cylinder is then soaked in 500 ml of 1,1,1-trichloroethylene and is left standing at room temperature for 12 hours.

The gel drying is carried out under hypercritical conditions in the same way as disclosed in Example 1.

The resulting silica aerogel is constituted by a cylinder of opaque material free from cracks or defects having a diameter of 47 mm, a height of 120 mm, a density of 0.44 g/cm$^3$, a specific surface of 390 m$^2$/g, a volume of the pores of 1.27 cm$^3$/g, and an average diameter of the pores of 118 Å.

EXAMPLE 5

The aerogels obtained as disclosed in the Examples from 1 to 4 are gradually heated in air up to the temperature of 950° C. at the heating speed of 3° C./minute, and are maintained at the temperature of 950° C. for 18 hours, are further heated up to 1150° C. at the heating speed of 3° C./minute, are kept at the temperature of 1150° C. for 2 hours and are then rapidly cooled down to room temperature. Such a thermal treatment causes the sintering of the aerogel and produces transparent, glass-like bodies of 2.19 g/cm$^3$ of density and having characteristics analogous to those of fused silica.

We claim:

1. Process for preparing monoliths of an aerogel of at least one oxide, which process comprises the following operating steps:
   (a) mixing an alkoxide of at least one metal with water in the presence of an acidic catalyst to form a mixture;
   (b) hydrolyzing the mixture obtained in step (a) to form a hydrolysate;
   (c) adding an oxide of at least one metal as a fine powder having a high specific surface area to the hydrolysate of step (b) to form a colloidal solution;
   (d) causing the colloidal solution of step (c) to become a gel;
   (e) washing the gel;
   (f) drying the gel at values of temperature and pressure which are higher than the critical pressure and temperature values of the solvent used for the washing to form said monolith.

2. Process for preparing aerogel monoliths according to the claim 1, in which the metal of step (a) is selected from among silicon, aluminum, zirconium and titanium.

3. Process for preparing aerogel monoliths according to claim 1, in which the metal is silicon.

4. Process for preparing aerogel monoliths according to claim 1, which in step (a) of claim 1 the alkoxide is preferably selected from the group consisting of tetramethoxy silane and tetraethoxy silane.

5. Process for preparing aerogel monoliths according to claim 1, in which the gelation of step (d) is carried out at a temperature between room temperature and 50° C.

6. Process for preparing aerogel an monoliths according to claim 1, in which the gel washing of step (e) is carried out by means of a chlorinated organic solvent.

7. Process for preparing aerogel monoliths according to claim 6, in which the gel washing is preferably carried out with 1,1,1-trichloroethylene.

8. Process for preparing a monolith of aerogel of at least one oxide, said process consisting essentially of:
   (a) mixing an alkoxide of at least one metal selected from the group consisting of silicon, aluminum, zirconium and titanium with a liquid which consists of water in the presence of an acidic catalyst to form a mixture;
   (b) hydrolyzing the mixture of step (a) to form a hydrolysate;
   (c) adding an oxide of a metal selected from the group consisting of silicon, aluminum, zirconium and titanium to the hydrolyzate of step (b), as a fine powder having a high surface area to form a colloidal solution;
   (d) causing the colloidal solution of step (c) to turn into a gel;
   (e) washing the gel of step (d) with a chlorinated solvent; and
   (f) drying the gel of step (e) at a temperature and pressure which are higher than the critical pressure and temperature of the solvent used for washing, to form said monolith.

9. A process defined in claim 8, wherein the metal is silicon.

10. A process as defined in claim 8, wherein the metal is aluminum.

11. A process as defined in claim 8, wherein the metal is zirconium.

12. A process as defined in claim 8, wherein the metal is titanium.

* * * * *